Figure 1:
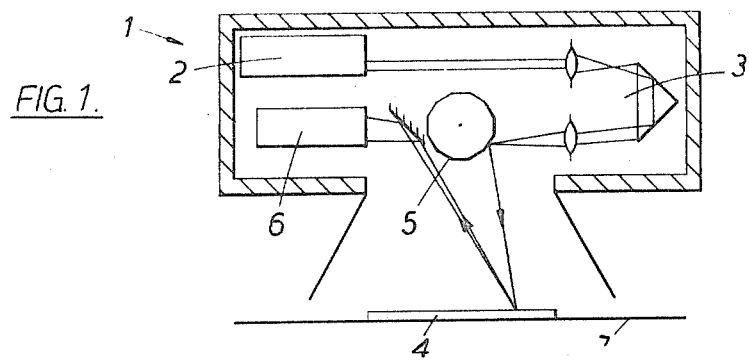
Figure 1:
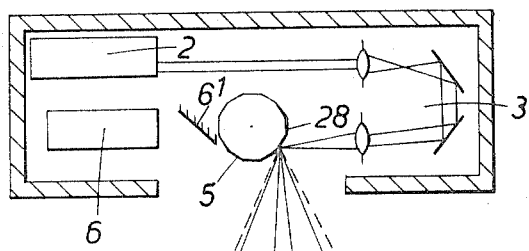

United States Patent [19]

Clarke

[11] 3,836,261

[45] Sept. 17, 1974

[54] DEVICE FOR DETECTION OF BLEMISHES ON OPPOSITE FACES OF A PLANAR OBJECT

[75] Inventor: Graham Morley Clarke, Edinburgh, Scotland

[73] Assignee: Ferranti Limited, Hollinwood, England

[22] Filed: July 18, 1973

[21] Appl. No.: 380,216

[30] Foreign Application Priority Data
July 29, 1972 Great Britain................ 35610/72

[52] U.S. Cl................ 356/200, 250/572, 356/163, 356/210, 356/237
[51] Int. Cl.. G01n 21/16, G01b 11/00, G01n 21/48
[58] Field of Search .......... 356/120, 159, 160, 163, 356/199, 200, 210, 237; 250/560, 563, 572

[56] References Cited
UNITED STATES PATENTS
3,515,475  6/1970  Zukor ................................ 356/163
3,646,353  2/1972  Bhullar .............................. 356/200

Primary Examiner—Vincent P. McGraw
Attorney, Agent, or Firm—Cameron, Kerkam, Sutton, Stowell & Stowell

[57] ABSTRACT

A detector of blemishes in opposite faces of a substantially planar object or web comprises a scanning station past which the object moves, the scanning station including a laser, a lens system to focus the beam onto the surface and a detector to receive light diffusely reflected from the surface and to produce a blemish signal when a change is detected in the amount of light reflected. The scanning station is arranged with respect to the object so that the beam scans in a direction normal to the plane of the object and mirrors are provided, inclined to each face of the object such that the scanning beam strikes each mirror in turn and is reflected therefrom to scan both faces of the object.

7 Claims, 5 Drawing Figures

DEVICE FOR DETECTION OF BLEMISHES ON OPPOSITE FACES OF A PLANAR OBJECT

This invention relates to the detection of blemishes in surfaces.

Detectors of blemishes are available in which light from a high intensity xenon lamp, or from a laser, is focussed into a narrow beam which strikes a moving surface, means being provided to cause the beam to scan the moving surface transversely to its direction of movement. Light reflected or transmitted by the surface is collected and detected by a photodetector, a variation in the detected light indicating a change in the intensity of the reflected or transmitted light resulting from a blemished surface.

Such detectors have been used for the detection of blemishes in one surface of a web or substantially planar object and normally have been positioned with respect to the surface so that the limits of scanning of the beam coincides with the edges of the web or object. The detection of blemishes in the other surface requires either re-passing the web or object with the other surface adjacent the detector or have a second detector adjacent the other surface.

It is an object of the present invention to provide a detector of blemishes on both faces of at least one web, or substantially planar object, without requiring to re-pass the web or object through the detector.

According to the present invention a detector of blemishes in opposite faces of a substantially planar object, or web, comprises a scanning station arranged to be movable relative to the web in a parallel plane containing a source of a beam of electromagnetic radiation, means for focussing the beam onto the object, scanning means for causing the beam to scan repetitively across the object, and means for receiving radiation diffusely reflected from the object and providing an output signal which alters in response to changes in intensity of the received radiation, the scanning station being arranged with respect to the object such that the beam from the scanning station scans in a direction normal to the plane of the object, and a set of reflective surfaces in the path of the beam said surfaces being arranged to be adjacent to each of said opposite faces and inclined to the plane of the object such that in each scan the beam is reflected from each reflective surface in turn to scan said opposite faces transversely to the direction of said relative movement.

Figure 2:
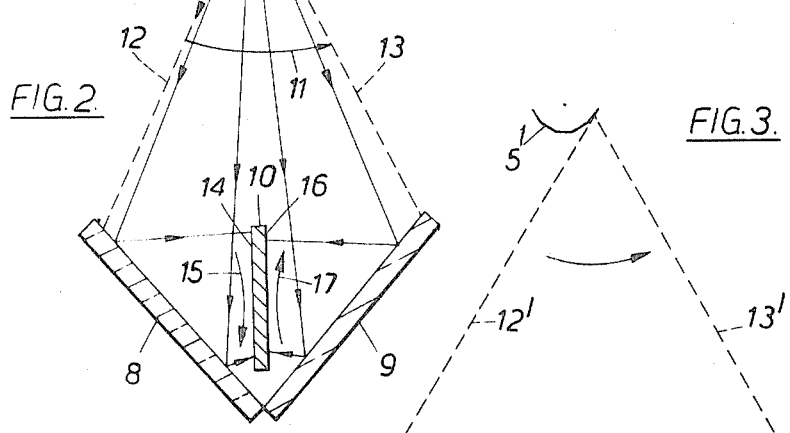
Figure 3:
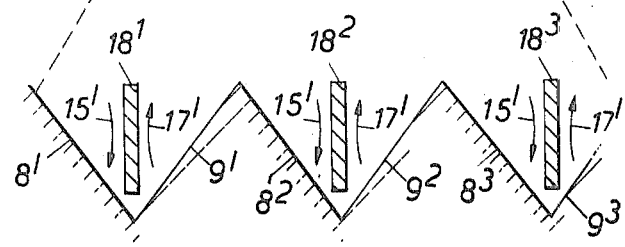
Figure 4:
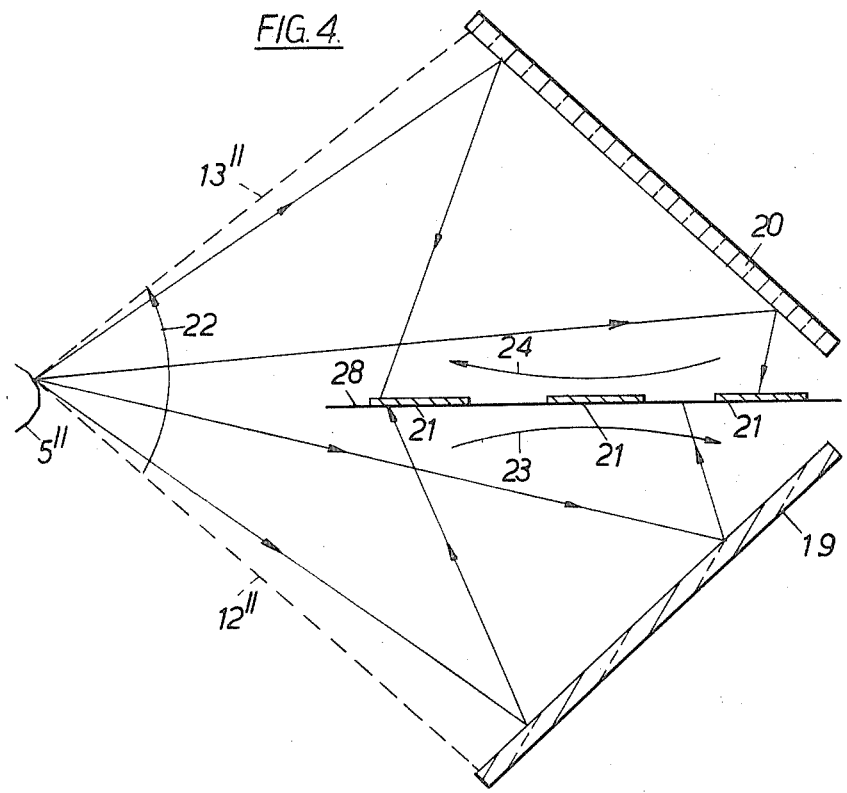
Figure 5:
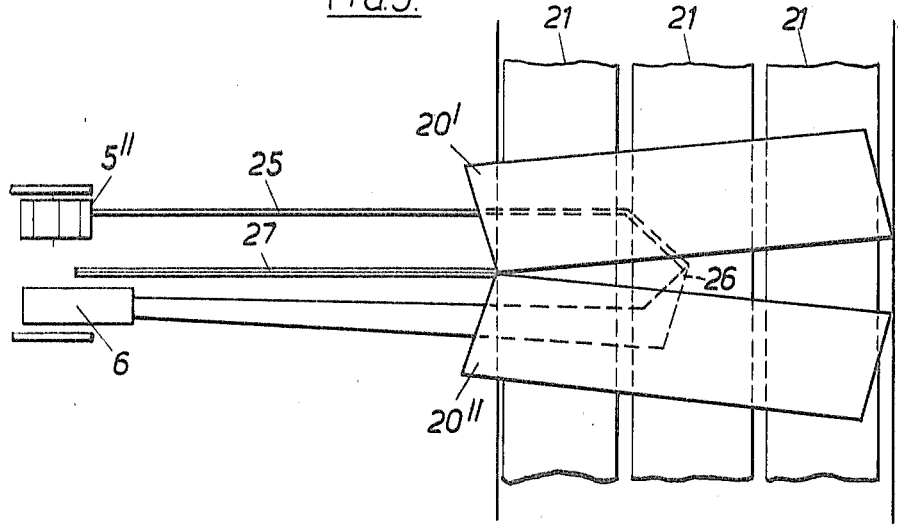

The invention will now be described by way of example with reference to the accompanying drawings, in which:

FIG. 1 is a sectional elevation of the optical apparatus of a blemish detector of known form as used to detect blemishes in a surface of a moving web, FIG. 2 is a sectional elevation of the optical apparatus of a blemish detector according to the present invention as used to detect blemishes in both faces of a moving web, FIGS. 3 and 4 each show a modified form of the detector of FIG. 2 used to detect blemishes on both faces of each of a plurality of moving webs, and FIG. 5 is a plan view of the detector of FIG. 4 showing a modified arrangement of the reflecting surfaces.

Referring to FIG. 1 there is shown a sectional elevation through the optical apparatus 1 of a blemish detector of known form. Light or near-visible radiation in a continuous beam from a laser 2 is focussed by focussing means 3 onto a surface 4 by way of a reflective facet of a plane multifaceted mirror 5. The mirror 5 is rotatable about an axis parallel to the planes of its facets so that as each facet interrupts the beam by moving through it, the beam is caused to scan across the surface. If the surface is caused to move in a direction perpendicular to the plane of the Figure the speed of this movement and the rotational speed of the mirror 5 may be adjusted so that the beam crosses the surface in the form of a raster at the desired line spacing. Light diffusely reflected from the surface 4 is collected by a photo-detector 6. If the finely focussed beam crosses a blemish on the surface then the amount of light reflected at the frequency of the incident light changes and the corresponding change in signal from the photodetector is used to derive an indication of the position and extent of the blemish in subsequent processing apparatus of the blemish detector.

The blemish detector according to the present invention is shown in FIG. 2. The scanning station 1 is similar to that described with reference to FIG. 1 and like parts have the same reference numerals.

The detector has two plane mirrors 8 and 9 with the reflecting faces inclined orthogonally to each other and in the path of the beam from the mirror 5. The web, shown in section at 10 is moved past the scanning station in a direction parallel to the axis of rotation of the mirror 5, that is, perpendicular to the plane of the Figure, with the plane of the web bisecting the angle between the mirrors.

In operation the beam of light from the laser is caused to scan, by reflection from the rotating mirror 5, in the direction of the arrow 11 between the limits shown by broken lines 12 and 13.

As the beam scans from left to right during the first part of the scan it is incident on the face of the mirror 8 and is reflected toward the surface 14 of the web 10, scanning over that surface in the direction of arrow 15. The light striking the surface is diffusely reflected in all directions and a portion of this falling on the mirror 8 is reflected in the general direction of the scanning mirror 5. Adjacent the scanning mirror is a plane mirror 6' which serves to divert the reflected light towards the photodector 6. During the second part of the scan the beam is incident on the face of the mirror 9 and is reflected towards the surface 16 of the web 10 scanning over it in the direction of the arrow 17. During this part of the scan light diffusely reflected from the surface is reflected by way of mirrors 9 and 6' towards the photodetector 6. Thus both faces of the web are scanned in opposite directions.

FIG. 3 shows an alternative arrangement in which a plurality of pairs of inclined mirrors are shown disposed adjacent each other in the direction of scan of the incident beam. This arrangement is suitable for the detection of blemishes in the faces of webs which are narrow in relation to the width of the scan. The beam from the mirror 5 scans between the positions shown by the broken lines 12' and 13' and is incident upon mirrors $8^1$, $9^1$, $8^2$, $9^2$, $8^3$ and $9^3$ in succession. As the scanning beam is reflected from the mirrors 8 to each of webs $18^1$, $18^2$ and $18^3$ it scans over both surfaces of each web in turn in the direction of the arrows 15' and 17' perpendicular to its direction of motion. Light diffusely reflected by the surfaces is reflected by the mirror surfaces towards the photodetector.

This arrangement is suitable for webs which can be held in position by tension imparted by the transport means, and has the advantage that the two faces of each of the webs are scanned before the beam crosses the next web.

A further alternative arrangement is shown in FIG. 4. In this Figure only part of the rotating mirror 5" is shown as being the source of a scanning beam of light between the lines 12" and 13" and the plane mirrors 19 and 20 correspond to the mirrors 8 and 9.

In this arrangement webs 21 are moved parallel to each other and in the same plane, that plane bisecting the angle between the mirrors 19 and 20. The webs are arranged to move in a direction perpendicular to the plane of the Figure and the beam is arranged to scan in the plane of the Figure in the direction of arrow 22.

Operation is as described for the arrangement of FIG. 2 in that for the first part of the scan, the beam is reflected from the mirror 49 and scans the lower surface of each of the webs 21 in turn in the direction of arrow 23 and for the second part of the scan is reflected from the mirror 20 and scans the upper surface of each of the webs 21 in the direction of arrow 24.

Light diffusely reflected from the surfaces of the webs is returned to the detector 6 (not shown in FIG. 4) by reflection from the mirror 19 or 20. In operation it is possible for dust to lodge on the mirror surfaces and cause back-scattering of the incident beam, resulting in false indications of blemishes. To avoid such false indications, the paths of the incident and reflected light are displaced in the direction of motion of the webs, as shown in the plan view of the arrangement shown in FIG. 5.

The mirror 20 is split into two parts 20' and 20" inclined to each other as well as to the plane of the webs. Incident light from the rotating mirror 5" forming a beam 25 is reflected from the mirror 20 onto the surface of a web at a point 26. Light diffusely reflected from the web is reflected by mirror 20" towards photodetector 6. The incident and reflected beams are therefore separated in the direction of motion of the web. To ensure a complete separation the paths of the light are divided by a partition 27. A similar arrangement (not shown) is used for the mirror 19.

The webs may be replaced by a succession of substantially planar individual objects if the objects are symmetrical about an axis in their plane, the arrangement of FIG. 4 being suitable with the objects being supported on a conveyor 28 having apertures therein both to support the objects and permit scanning from both sides.

In a modified form of optical arrangement (not shown) curved mirrors are employed to ensure a constant path length for the incident light throughout the scan, thereby maintaining the beam sharply focussed onto the surfaces being scanned.

For very small objects or narrow webs, the arrangements of FIGS. 3 and 4 can be combined so that a plurality of mirror combinations are shown in FIG. 3 each pair of inclined mirrors being on opposite sides of a plurality of objects or webs are arranged in a side-by-side configuration as shown in FIG. 4.

What we claim is:

1. A detector of blemishes in opposite faces of a substantially planar object or web comprising a scanning station arranged to be movable relative to the web in a parallel plane and containing a source of a beam of electromagnetic radiation, means for focussing the beam onto the object, scanning means for causing the beam to scan repetitively across the object, and means for receiving radiation diffusely reflected from the object and providing an output signal which alters in response to changes in intensity of the received radiation, the scanning station being arranged with respect to the object such that the beam from the scanning station scans in a direction normal to the plane of the object, and a set of reflective surfaces in the path of the beam, said surfaces being arranged to lie adjacent to each of said opposite faces and inclined to the plane of the object such that in each scan the beam is reflected from each reflective surface in turn to scan said opposite faces transversely to the direction of said relative movement.

2. A detector of blemishes as claimed in claim 1 in which the set of reflective surfaces comprises two such surfaces arranged one adjacent to each face of the object such that the planes of the mirrors intersect in a line in the plane of the object and extending in the direction of the relative movement.

3. A detector of blemishes as claimed in claim 1 in which the set of reflective surfaces comprises adjacent each face, a pair of mirrors equally inclined to the face and inclined to each other and spaced apart in the direction of said relative movement, the arrangement being such that the beam is reflected from one mirror of the pair onto the surface and radiation from the surface is reflected by the other mirror of the pair to said means for receiving radiation.

4. A detector of blemishes as claimed in claim 1 in which each set of reflective surfaces extends so as to lie adjacent a plurality of said planar objects located side-by-side in a single plane.

5. A detector of blemishes as claimed in claim 1 in which there is provided a plurality of sets of reflective surfaces arranged adjacent to each other in the direction of scan of the beam such that the beam is incident on each set of reflective surfaces in turn.

6. A detector of blemishes as claimed in claim 1 in which the reflective surfaces are plane mirrors.

7. A detector of blemishes as claimed in claim 1 in which the source of the beam of electromagnetic radiation is a laser.

* * * * *